United States Patent
Fisher et al.

[15] 3,656,579
[45] Apr. 18, 1972

[54] FRICTION PANEL

[72] Inventors: John M. Fisher, Cuyahoga Falls; Kenneth E. Paige, Akron, both of Ohio

[73] Assignee: The B. F. Goodrich Company, New York, N.Y.

[22] Filed: Sept. 8, 1970

[21] Appl. No.: 70,316

[52] U.S. Cl. .............................................. 182/48, 193/25
[51] Int. Cl. ............................................................ A62b 1/20
[58] Field of Search ...................... 182/48, 49; 193/25, 32; 272/56.5 R

[56] References Cited

UNITED STATES PATENTS

| | | | |
|---|---|---|---|
| 3,070,203 | 12/1962 | Hailstone | 193/25 B |
| 1,416,073 | 5/1922 | Steinbach | 193/32 |
| 3,195,889 | 7/1965 | Hall | 272/56.5 R |

*Primary Examiner*—Reinaldo P. Machado
*Attorney*—John D. Haney and Harold S. Meyer

[57] ABSTRACT

A deceleration panel for the lower section of an aircraft escape slide to control the sliding speed of passengers leaving an aircraft in which longitudinal strips of rubber having a nonskid surface are mounted on strips of fabric supporting material for resisting sliding in the dry condition. The strips of fabric are fastened to a layer of three-dimensional fabric having stiff loops for draining away any water and projecting out of the water to resist sliding in the wet condition. The three-dimensional fabric is mounted on a backing member of fabric supporting material which has a coating of conductive material on the underside as do the strips of fabric supporting material to conduct static electricity away from the panel.

9 Claims, 3 Drawing Figures

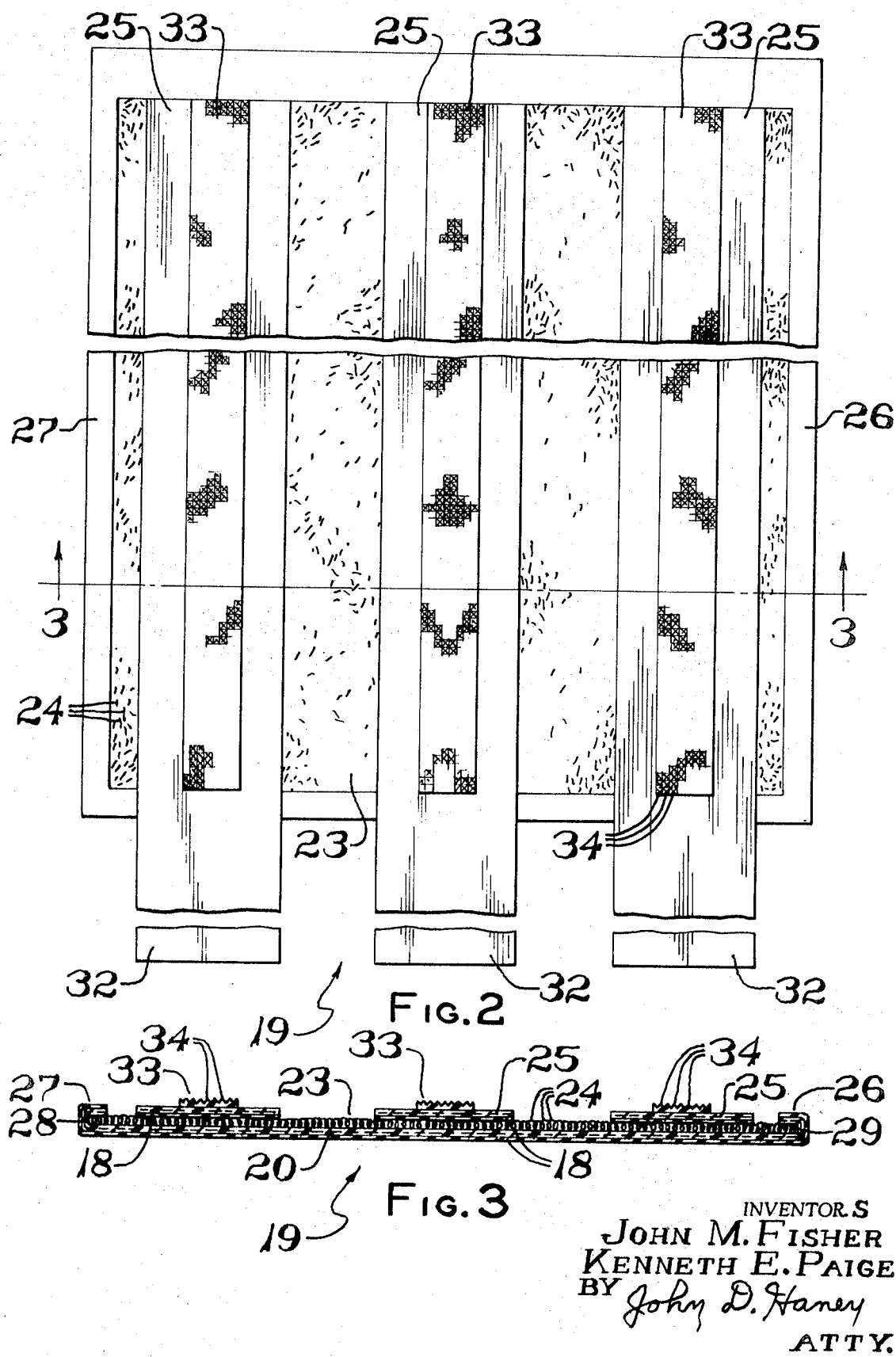

FRICTION PANEL

BACKGROUND OF THE INVENTION

This invention relates to inflatable escape slides for aircraft and particularly to the surface the passengers slide on. In the past, the sliding surface has consisted of a rubber-coated fabric and the coating has been of a substantial thickness to make the surface flame resistant. A rubber coating of this thickness has a high coefficient of friction which has made it difficult to provide proper sliding action. To overcome this difficulty, the surface has been dusted with talc which tends to dissipate rather quickly and when this happens the sliding action again is not satisfactory.

Another problem encountered with inflatable escape slides is the static electricity which is built up as passengers slide down the slides. Thus must be discharged without causing sparks which could ignite fuel during emergency evacuation. In the past, strips of conductive rubber have been laid on the upper surface of the slide to drain off the static charges. Difficulties have been experienced with these strips because they are exposed and subject to damage and, in addition, a sufficient number of these strips of a substantial size must be used so that the evacuating passenger does not lose contact with them during the sliding operation.

In the operation of these escape slides, the rubber-coated slide surface which may have a relatively high coefficient of friction under dry conditions becomes extremely slippery when wet and passengers may slide off the end at a high rate of speed which is dangerous and could cause serious injury. This problem also occurs when the angle of the slide is steep and the speed of sliding down the slide becomes excessive in the dry condition. With the larger planes in which the passengers may have to slide a distance of over thirty-five feet to reach the ground, it can be seen that an excessive sliding velocity can be reached under both wet and dry conditions.

SUMMARY OF THE INVENTION

According to this invention, a deceleration panel is mounted on the lower section of the slide to reduce the sliding speed so that passengers may walk away from the exit end of the slide. The panel is mounted on the slide surface which may be of a high temperature nylon fabric that will not burn and therefore does not require the heavy coating of rubber to make it flame resistant. Only enough neoprene rubber is applied to give it the desired coefficient of friction. The panel has a layer of three-dimensional fabric with stiff monofilament loops extending upward for providing a friction surface and draining away any water in that area of the panel. On top of this layer of three-dimensional fabric, strips of flame-resistant nylon are fastened which support strips of rubber having a nonskid surface for providing a friction surface in the dry condition. In order to drain away the static electricity, a coating of conductive rubber is applied to the underside of the flame-resistant nylon of the slide and of the strips at the deceleration panel. This coating being on the underside will not be damaged or broken and because it covers the complete area underneath the slide, there will be contact with the passengers evacuating at all times.

The accompanying drawings show one preferred form made in accordance and embodying this invention and which is representative of how this invention may be practiced.

BRIEF DESCRIPTION OF THE DRAWING

In the drawing:

FIG. 2 is a plan view of the deceleration panel, parts being broken away.

FIG. 3 is a cross sectional view of the deceleration panel taken along the plane of line 3—3 of FIG. 2.

DETAILED DESCRIPTION

Figure 1:
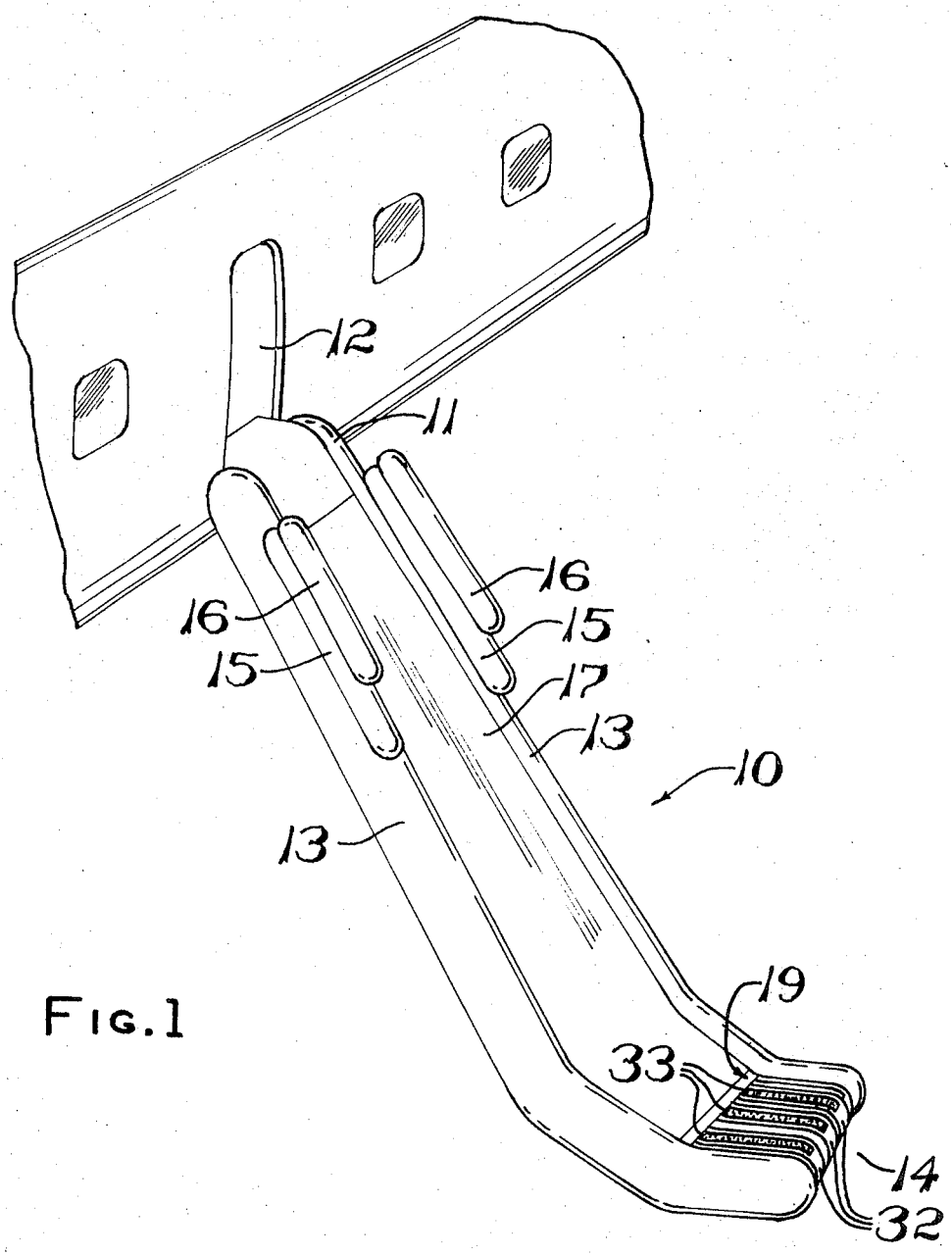
FIG. 1 is a view in perspective of an inflatable slide extending from an aircraft exit to the ground.

Referring to FIG. 1, an inflatable escape slide 10 is shown in the inflated condition with an entrance end 11 extending out of an aircraft doorway 12. The escape slide 10 has guiderail bumpers 13 along the edges extending from the entrance end 11 to an exit end 14 which may be turned upward to decrease the slope of the slide. Inflatable guiderails 15 and 16 may be mounted on top the guiderail bumpers 13 near the entrance end 11 of the slide 10 to help guide the evacuees onto the slide. A slide lane 17 is disposed between the guiderail bumpers 13 and has a surface of fabric material which is flame-resistant and able to conduct static electricity generated by the passengers to the ground.

A slide lane 17 is preferably of a flame-resistant material which will have a coefficient of friction that is low enough to provide for easy sliding of the evacuees while at the same time the speed of the descent is controlled. In this embodiment, a flame-resistant nylon material is used with a thin coating of chloroprene elastomer such as neoprene rubber applied to provide the desired coefficient of friction. A coating of conductive rubber 18 is applied to the underside of the nylon material for conducting the static electricity to the ground.

At the exit end 14 of the slide 10, the slide lane 17 is covered by a deceleration panel 19 for slowing the sliding speed of the evacuees so they may walk away from the end of the slide.

As shown more clearly in FIGS. 2 and 3, the deceleration panel 19 has a backing member 20 which may be of flame-resistance nylon with the coating 18 of conductive rubber on the underside to convey away charges of static electricity. Mounted on top of the backing member 20 is a three-dimensional fabric member 23 which has stiff loops 24 extending upwardly to provide spaces through which water may flow in the wet condition of the deceleration panel 19. This material may be a fabric woven of polyethylene and Saran in which the yarns are monofilaments. The material is heat treated after it is woven and shrinks providing the loops 24 which retain their shape and provide a rough surface which projects upwardly out of the water film within the loops to provide a suitable coefficient of friction for reducing the sliding speed of evacuees from the aircraft.

Supporting strip members 25 which may be of the same material as the backing member 20 and coated on the underside with the conductive rubber 18 are disposed longitudinally on top of the fabric member 23. These supporting strip members 25 may be fastened to the fabric member 23 and backing member 20 as by stitching with a suitable cord thread. The edges 26 and 27 of the backing member 20 may be turned up and overlap edges 28 and 29 of the fabric member 23. The turned-up edges 26 and 27 of the backing member 20 and the supporting strip members 25 cover approximately fifty percent of the surface of the deceleration panel 19 to insure that during passage of an evacuee over the panel there is always contact with material which has a conductive rubber coating so that any static charge generated by the sliding action may be conducted away from the deceleration panel. At the lower ends of the deceleration panel 19 the ends 32 of the strip members 25 extend around the exit end 14 of the escape slide 10 to make contact with the ground.

Friction strips 33 which may be of a rubber or rubber-like material such as chloroprene elastomer are fastened to the supporting strip members 25 as by stitching with suitable cord thread and have a friction surface which may be in the shape of many pyramids 34 to provide for reducing the sliding velocity of evacuees in the dry condition of the deceleration panel 19.

In operation in the dry condition, evacuees step out of the doorway 12 of the aircraft and slide down the slide lane 17 on the flame-resistant nylon material which has a thin coating of rubber or other rubber-like material such as chloroprene elastomer to provide controlled but rapid sliding over this section of the escape slide 10. At the exit end 14 of the slide 10, the passenger slides onto the deceleration panel 19 where the high coefficient of friction of the friction strips 33 slows his velocity to a point where normally he can walk away from the end of the slide. During the evacuation descent, any static electricity generated in passing over the slide lane 17 will be conveyed away by the conductive rubber coating 18 prior to reaching the deceleration panel. At the deceleration panel, static electricity generated will be conducted away by the coating of conductive rubber 18 on the underside of the backing member 20 and on the underside of the supporting strip members 25 which have ends 32 extending around the exit end 14 of the escape slide 10 into engagement with the ground.

In the wet condition as in the case of evacuation during rain or snow, the passengers will leave the aircraft in the same manner; however, the water will change the coefficient of friction of the slide lane to a slight extent and greatly reduce the effective coefficient of friction of the friction strips 33. This will be reduced somewhat by the drainage of water away from these strips 33 into the spaces between the loops 24 of the three-dimensional fabric member 23. These loops 24 which are of a stiff and upright construction will engage the evacuees and serve to provide a surface having high coefficient of friction to reduce the speed of the evacuees at the exit end 14 of the escape slide 10 so that they may walk away.

The construction of the deceleration panel 19 is especially useful and important when installed at the lower end of an aircraft escape slide; however, it is to be understood that this deceleration panel construction may also be used in other applications where resistance to sliding is necessary in the wet and dry conditions such as in various types of floor matting. Mats of this type of construction which conduct away the static electricity may also be used in applications such as in powder factories and hospital operating rooms where the build-up of a static electricity charge and the resultant sparking is dangerous.

We claim:

1. A friction panel providing resistance to sliding in the wet and dry condition comprising a three-dimensional fabric member having upstanding loops for draining water from the surface and presenting a rough surface having a high coefficient of friction in the wet condition and a strip member of friction material mounted over a portion of said fabric member to provide resistance to sliding in the dry condition of the panel.

2. A friction panel according to claim 1 wherein said strip member extends longitudinally of the friction panel and is spaced from the edges of said panel.

3. A friction panel according to claim 2 wherein said friction strip member is fastened to a supporting strip member mounted on top of said fabric member.

4. A friction panel according to claim 1 wherein said fabric member is mounted on a backing member of high strength fabric material.

5. A friction panel according to claim 4 wherein said friction strip member extends longitudinally of said friction panel and is spaced from the edges thereof and mounted on a supporting strip member which is fastened to said fabric member and backing member and wherein said backing member and said supporting strip member have a coating of conductive material on the underside to carry away charges of static electricity generated at the surface of the friction panel.

6. An aircraft escape slide adapted to be inflated and extend from the aircraft to the ground in an inclined position having an entrance end at the aircraft and an exit end where the slide contacts the ground, a slide lane extending between said exit end and entrance end, and a deceleration panel of high coefficient of friction mounted on said slide lane at said exit end of the slide, said deceleration panel having a three-dimensional fabric member with upstanding loops and longitudinal friction strip members mounted on top of said fabric member and spaced from edges of said fabric member.

7. An aircraft escape slide according to claim 6 wherein said friction strip member is mounted on a supporting strip member fastened to said fabric member.

8. An aircraft escape slide according to claim 7 wherein said supporting strip member has a coating of conductive material on the underside for carrying charges of static electricity from the surface of said panel and said supporting strip members extend beyond the end of the deceleration panel and around said exit end of the escape slide to a position where contact is made with the ground.

9. An aircraft escape slide according to claim 8 wherein there is a second longitudinal supporting strip member on which a friction strip member is mounted and which is disposed in parallel relationship to said friction strip member so that said supporting strip members cover at least fifty percent of the surface of the friction panel to provide contact with persons sliding over the panel.

* * * * *